(12) United States Patent  
Moravec et al.

(10) Patent No.: US 6,886,937 B2  
(45) Date of Patent: May 3, 2005

(54) OPHTHALMIC LENS WITH GRADED INTERFERENCE COATING

(75) Inventors: Thomas J. Moravec, Maple Grove, MN (US); Michael S. Boulineau, Forest Lake, MN (US)

(73) Assignee: Vision - Ease Lens, Inc., Minneapolis, MN (US)

( * ) Notice: Subject to any disclaimer, the term of this patent is extended or adjusted under 35 U.S.C. 154(b) by 0 days.

(21) Appl. No.: 10/356,033

(22) Filed: Jun. 20, 2003

(65) Prior Publication Data

US 2004/0257525 A1 Dec. 23, 2004

(51) Int. Cl.[7] .............................................. G02C 7/10
(52) U.S. Cl. ....................................... 351/165; 351/166
(58) Field of Search ................................. 351/159, 163, 351/165, 166

(56) References Cited

U.S. PATENT DOCUMENTS

| | | | |
|---|---|---|---|
| 2,409,356 A | 10/1946 | Hutchings | 351/165 |
| 2,675,740 A | 4/1954 | Barkley | 351/165 |
| 4,609,267 A * | 9/1986 | Deguchi et al. | 351/163 |
| 4,838,673 A | 6/1989 | Richards et al. | 351/44 |
| 5,327,180 A | 7/1994 | Hester, III et al. | 351/165 |
| 5,757,459 A | 5/1998 | Bhalakia et al. | 351/168 |
| 5,827,614 A | 10/1998 | Bhalakia et al. | 428/411.1 |
| 5,856,860 A | 1/1999 | Bhalakia et al. | 351/168 |
| 6,338,426 B1 | 1/2002 | Okiyama | 223/96 |
| 2004/0070726 A1 * | 4/2004 | Ishak | 351/163 |

* cited by examiner

*Primary Examiner*—Scott J. Sugarman  
(74) *Attorney, Agent, or Firm*—Mark A. Litman & Associates, P.A.

(57) ABSTRACT

A method of making an optical element that includes a thermoplastic power portion, the method including laminating a first thermoplastic sheet to one side of a functional film, laminating a second thermoplastic sheet to a second side of the functional film, and affixing either the first thermoplastic sheet or the second thermoplastic sheet to the power portion, with the other of the first or second thermoplastic sheets being open to atmosphere.

21 Claims, 1 Drawing Sheet

OPHTHALMIC LENS WITH GRADED INTERFERENCE COATING

BACKGROUND OF THE INVENTION

1. Field of the Invention

The present invention relates to the field of ophthalmic lenses, particularly the field of ophthalmic lenses with a polarizing function, and more particularly to a polymeric ophthalmic lens with a polarizing function and interference layer to provide aesthetic effects.

2. Background of the Art

In the past, it has generally been known to polarize lenses to reduce the glare produced by reflected light. Polarization is effected by means of a double refraction of visible radiation (and ultraviolet radiation) on a transparent surface wherein the radiation is split into two beams, one reflected and one transmitted. Each one of these beams is partially polarized. Sun light is generally identified as unpolarized, unless reflected from surfaces as noted above, and various dichroic polarizing materials have been used in the past to polarize sunlight as it passes through a layer of the dichroic material. It is the reduction of certain polarized light reflected from surfaces that is the basis for the use of polarized sunwear in the reduction of glare.

U.S. Pat. Nos. 6,338,426; 5,856,860; 5,827,614; and 5,757,459 describe a method of making an optical element such as an ophthalmic lens that includes a thermoplastic power portion, the method including laminating a first thermoplastic sheet to one side of a functional film (especially a polarizing layer), laminating a second thermoplastic sheet to a second side of the functional film, and affixing either the first thermoplastic sheet or the second thermoplastic sheet to the power portion, with the other of the first or second thermoplastic sheets being open to atmosphere. This method facilitates the formation of polarized lenses from polymeric lens materials.

Bigradient coatings had at one time not been used in combination with polarization films because the heat necessary for applying bigradient coatings destroys polarization films. U.S. Pat. No. 2,409,356 describes a coating for lenses applied as a film on upper and lower portions of the lenses by a high vacuum thermal evaporation process. The problem with this process is that polarization films cannot also be applied to the lenses because of the high temperature requirements necessary to deposit the bigradient material. U.S. Pat. No. 2,675,740 describes another lens using a high vacuum thermal evaporation process, but the coating is of uniform thickness and different reflective properties are achieved by subjecting the lens to electric glow discharge oxidation.

U.S. Pat. Nos. 4,838,673 (Richards) and 5,327,180 (Hester) describe methods and articles having bigradient coatings in combination with polarizing lenses, usually glass (mineral glass) lens materials. In the Richards patent, two glass lenses are laminated with an intermediate polarizing layer, and the bigradient coating is vapor coated onto the front surface of the lens. In the Hester patent, the bigradient film is positioned between the two lens elements, adjacent the polarizing layer. A number of other coatings may be combined with the lenses, such as waterproofing coatings and antireflective coatings.

The use of polymeric lenses has greatly increased in the ophthalmic market, and the use of various coatings and additional features is important to maintain a full line of products, Polymeric lenses offer their own requirements for use and have their own properties that do not make them amenable to treatments and features that have been traditionally used with glass lenses. Also, constructions used in the prior art for glass lenses would be inefficient for polymeric lenses. For example, The use of an internal interference layer (the bigradient layer) of Hester in a polymeric system would make it difficult to control the color of the layer (as it is not in contact with air), might require the use of dyes and pigments, and could lead to significant color variations between lots of the lenses. Additionally, polymeric lenses often require hardcoatings to protect the polymer from abrasion, and the use of hardcoatings has not been considered in the combination of glass lenses, interference layers, and polarizing layers.

SUMMARY OF THE INVENTION

The present invention addresses resolution of problems relating to the manufacture and use of polymeric lenses having interference layers, such as bigradient coatings. The lenses are constructed by first applying a hardcoating to at least one exterior surface of the lens and then applying the interference coating over the hardcoating. Thin hydrophobic coatings may then be applied over the interference layer(s). The lenses may be laminated lens constructions, with polarizing layers between the lamina of the lens. The interference coating may be deposited or etched to provide images on the surface of the lens in regions that will not directly impact the vision of the wearer. For example, logos of manufacturers or endorsing stars may be positioned on the outer edges or periphery of the lens face by masking the surface during deposit of the interference layer or by etching or ablating the interference layer in a desired pattern. Although removal or failure to deposit the interference coating over optically active regions of the lens (e.g., areas through which light from directly in front of the wearer's view path will be transmitted to the eyes of the wearer) will diminish the protective and coloration effect, some sacrifice of the protective effect may be acceptable in exchange for aesthetic effects. For example, partial teaching or non-deposit of the interference coating may allow images (such as snake eyes, lizard eyes, or other unusual images) to be left on the lens, still providing significant, but diminished protection and adding enhanced aesthetic value to the lens appearance, It is more desirable, however, to have the majority of the imagery in the interference layer to be in the outer 40 or 50 or 60 percent of the area of the lens.

The lens preferably is preferably constructed of two separate lens components, as described in U.S. Pat. Nos. 6,338,426; 5,856,860; 5,827,614; and 5,757,459. Other methods of forming laminate lenses are known in the art and may be used in the practice of this invention without deviating from the objectives and benefits. The two separate lens elements, as later described in greater detail, are produced, and the polarizing layer (or polarizing laminate in a preferred embodiment) is positioned between the two separate lens elements. Once the lens with its primary ophthalmic components and requirements have been constructed, a series of additional treatments may be performed to practice the present invention. After construction of the lens, a hardcoating is applied to at least one of the exterior surface (the front exterior surface or the rear exterior surface). Hardcoatings or abrasion resistant coatings are necessary for commercially successful polymeric ophthalmic lenses, which would otherwise scratch, mar or abrade too easily. The interference layer, particularly a bigradient interference layer is then applied over the hardcoating. Although the interference layers are generally made of non-polymer materials (as described later) and are more scratch resistant than the underlying polymer, they may not be sufficiently abrasion resistant for ophthalmic use, especially in bigradient lenses where an intermediate zone between the at least two interference coatings exposes an underlying area, which would allow for scratching in the exposed area. As this area tends to be in the direct field of view of the wearer, scratching would be very detrimental to both the utility and aesthetics of the lens. Therefore, it is desirable that the mirror coating is not placed alone on bare plastic, but that the hard coating should also under the mirror coating.

It should be noted that the interference layers comprise coatings of materials that cause a controlled interference with the reflection and refraction of light from and between surfaces of the lens. These interference layers, as well known in the art, can also be used (without the necessity of dyes or pigments) to provide colors to the lens, not merely by the color produced by the materials themselves, but also by the effect of the interference. Dyes or pigments may be used in those or other layers to adjust colors (e.g., photochromics, tints, etc.), but they are not essential. In the use of segmented interference layers (the bigradient layer is a specific example of two segments, usually on the top and bottom of the lens, with edges and general alignment of the segments being aligned with a polarization axis of the lens when a polarizing function is present in the lens), there are 'gaps' between the segments where there is insufficient deposition or coating of the material constituting the interference layer. These gaps or uncoated areas may actually not be completely free of that material constituting the interference layer, especially where vapor or atomic deposition processes are used to provide the interference layer. These deposition processes allow for migration of atoms or molecules in the deposition environment, with coating areas determined by the placement of screens or barriers between the vapor phase material source and the surface of the lens where the material is being deposited. Because there is a vapor phase drift of materials, some will deposit in areas that are substantially blocked from direct deposition will still be coated. Therefore, where the term gap or separation between interference zones is used, it is not intended or limited to areas that are 100% free of material that forms the interference layer, but includes areas where there is some material present, even enough material to cause some visible effects.

The lens is preferably coated on its inner surface with an anti-reflectant layer by any available process, such as a vacuum process. Either of the exterior surfaces, such as the front outer surface or the interior surface (nearest the eye of the wearer) has an interference layer(s) such as a bigradient or double gradient coating adhered thereto. To apply the double gradient coating, the lenses are usually first cut for a precision fit (although they may be molded, ground and/or cut). Next, the precut polarized lenses are cleaned.

The preferred bigradient materials include metal oxides and metals, such as chrome, $CrO_2$, $SiO_2$, SiO, $TiO_2$, and mixtures of these materials. These materials are provided in a vapor or plasma phase for sufficient time to apply the desired amount and distribution of the coating to the surface. The layer may be deposited by traditional vapor deposition with the solid material vaporized from boats carrying the material, or by sputtering, or any other technique that produces a vapor or plasma phase that can controllably deposit to form the layer on the lens surface. Conditions are usually tightly controlled. Interior pressure is kept, by way of non-limiting examples, at from $1\times10^{-3}$ to $1\times10^{-2}$ Pascals and the lenses are not normally exposed to heat greater than 70° C. Since the polarization film is very sensitive to heat, the low temperature is desirable to prevent damage to the film. In traditional vaporization deposition, the coating material is first placed inside a vacuum vaporization dome. Next, an electric current is applied to the dome in order to heat the coating material to the point of vaporization. Vaporized material (metal or molecules) move upwardly from the vaporization source towards the lenses. A protective shield, barrier or mask is disposed at the bigradient line to block the vaporized materials and leave the line without coating material, thereby resulting in a split mirror.

Numerous methods for incorporating polarizing properties into lenses made of material other than thermoplastic material are known. For example, U.S. Pat. No. 3,051,054 to Crandon describes a method of providing a glass lens with a film of light polarizing material. Also, U.S. Pat. No. 4,495,015 to Petcen describes a method of laminating a thermoset/thermoplastic wafer to an ophthalmic glass lens.

Various patents disclose methods of incorporating a polarizing film or wafer within a lens cast of thermoset material. For example, U.S. Pat. No. 3,786,119 to Ortlieb discloses a laminated plate of polarizing plastic material that is formed into a polarizing screen. The polarizing screen is placed within a mold which is filled with polymerizable or polycondensible liquid resin. U.S. Pat. No. 3,846,013 discloses a light-polarizing element formed by sandwiching light-polarizing material between thin layers of optical quality transparent polymeric material. The light-polarizing element is placed within a mold, and a polymerizable monomer is placed in the mold on either side of the light-polarizing element.

U.S. Pat. No. 3,940,304 to Schuler discloses a shaped light polarizing synthetic plastic member that is disposed between layers of an optical quality synthetic monomeric material in a mold. A monomeric material is placed within the mold and polymerized to form a composite synthetic plastic light polarizing lens structure. U.S. Pat. No. 4,873,029 to Blum discloses a plastic wafer that may include polarizing features. The plastic wafer is inserted into a mold between liquid monomer molding material. The mold is then subjected to oven-curing to polymerize the liquid monomer. Additionally, U.S. Pat. No. 5,286,419 to van Ligten et al. discloses a shaped polarizing film that is embedded in pre-gelled resin. The resin is cured to form a light polarizing lens. However, despite the availability of these methods for incorporating a polarizing film or wafer within a lens cast of thermoset material, a need remains for an improved polarizing lens. For example, delamination of cast polarizing lenses remains a significant problem. Also, cast lenses are relatively heavy and offer less than adequate levels of impact and shatter resistance. Finally, manufactures continue to encounter difficulties making polarizing cast lenses with optimum refractive index values.

Another reference, U.S. Pat. No. 5,051,309 to Kawaki et al., concerns a polarizing plate that is made by laminating polycarbonate film on both sides of a polarizing thin layer. The polarizing thin layer is composed of a polymeric film and a dichroic dye oriented on the polymeric film. According to the patent, suitable uses of the polarizing plate include goggles and sunglasses. However, the polarizing plate of U.S. Pat. No. 5,051,309 would not be suitable for use as an optical lens capable of meeting ophthalmic prescription specifications. For example, the polycarbonate film included in the polarizing plate of this patent lacks the material integrity needed for successful grinding and polishing of polycarbonate optical elements to prescription specifications. Polycarbonate that is ground and polished to make optical elements must have sufficient material integrity to withstand the heat and pressure generated during grinding and polishing operations. The lack of material integrity of the polycarbonate film used in the Kawaki polarizing plate would affect cosmetic properties, as well as, the impact strength of any prescription specification optical elements made by grinding and polishing the polycarbonate film.

U.S. Pat. No. 5,531,940 describes a photochromic lens and a method for manufacturing a photochromic lens comprising four alternative methods. In a first method, an uncured resin is positioned between a mold surface and a preformed lens. The resin is cured to the shape of the lens and the composite lens is impregnated with photochromic material. In a second method, an uncured resin containing a photochromically active ingredient is positioned between the lens and the mold, and the resin cured to bond it to the lens. In a third process, an uncured resin containing photochromic ingredients is positioned against the mold surface and partially cured to a gel to form a coated mold. Then a second uncured resin and then a lens preform are positioned over the gel layer in the mold. A cure step is performed to secure all of the layers together. In a fourth process, a second uncured resin is disposed between a convex surface of the lens preform and the molding surface of the mold. The second uncured resin is cured to a gel state on the mold to form a covered mold. Then the first uncured resin is positioned adjacent the gel and then the lens preform positioned over the first uncured resin. A final cure step is then provided. In all embodiments, a mold must be available that is approximately specific to the curvature of the face of the lens facing that mold surface, so that the cast and cured resin layer is of uniform thickness and conforms to the same curvature of both the mold and the convex surface of the lens.

DETAILED DESCRIPTION OF THE INVENTION

Figure 1:
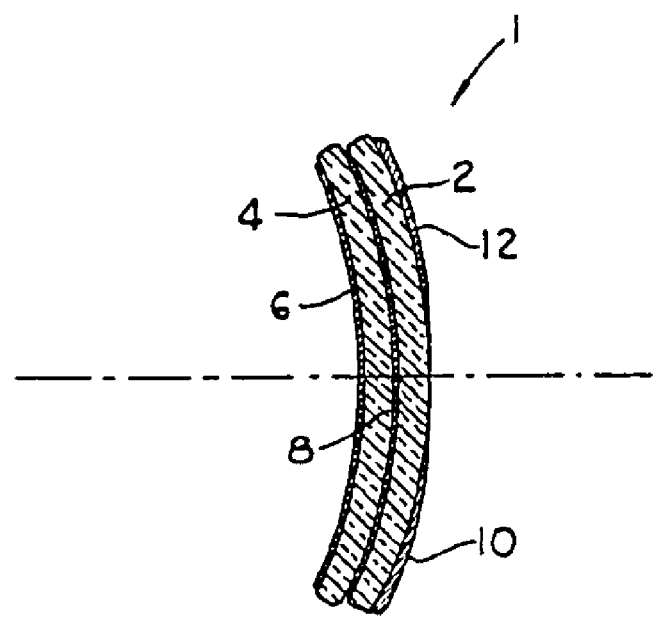
FIG. 1 is a detailed cross sectional view of a lens embodying the present invention.
Figure 2:
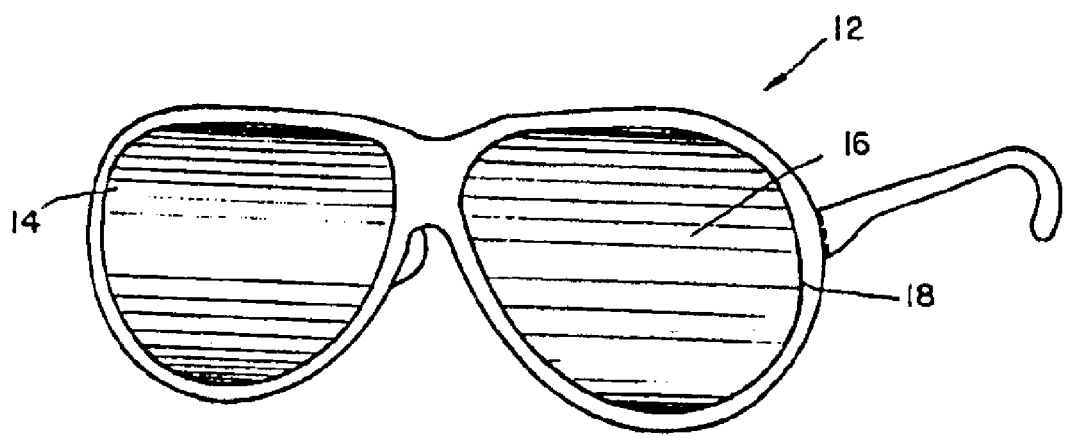
FIG. 2 is a perspective view of glasses employing a pair of the claimed lenses.

Referring to FIGS. 1 and 2, a lens is generally referred to by the numeral 1. The lens 1 has two regions separate lens elements 2 and 4. Between the lens elements 2 and 4 is the polarizing layer(s). On the most forward surface of the front lens element 2 are the two segments 10 and 12 of the bigradient layer. The two segments 2 and 4 are laminated together with a polarization film 8 shown between the two lens segments 2 and 4. The dashed line represents the focal axis of the lens. An anti-reflectance coating 6 helps eliminate glare and may be vacuum processed on the inside of the lens (referring to the concave surface). The bigradient or double gradient coating 10 and 12 has applied to the outside of the lens 2 (referring to the convex surface). A hardcoating is present (not shown) between the outer surface of the outer lens 2 and the inner surface of the bigradient layer.

As shown in FIG. 2, a pair of sunglasses 12 is shown to have an upper area 14, a horizontal bigradient line 16 and a lower bigradient coated area 18. At the bigradient line 16, there is virtually no bigradient coating material (as described elsewhere herein). This central line may be illustrated in FIG. 1 as along the focal axis of the lens, but it is not required to be so precisely positioned. The optional anti-reflectant coating 6 is preferably applied before implementing the bigradient coating process. However, the anti-reflective coating may be applied after the cleaning process. Preferably, the anti-reflectant coating is applied after the precutting of the lenses.

The mirror coating may be applied by conventional deposition techniques, for example vacuum deposition, vapor deposition or other evaporative processes that deposit of metal film on a finished lens. A chemical solution of a pristine metallic layer may be deposited on part of a casting mould with a lens subsequently cast against that mould.

The use of a mirror reflective coating on the outside of an ophthalmic lens is suggested in U.S. Pat. No. 4,070,097 to Gelber. The coating is said to have two layers, a dielectric layer and a metal layer. For the pure metal layer, non-limiting examples of suitable materials are said to include nickel, chromium, Inconel™ and Nichrome™ (a material comprised essentially of nickel and chromium). The metal layer may typically to have a thickness ranging from 5 to 90 Angstroms. Various metal and non-metallic inorganic oxide materials, including silicon dioxide, titania, chromia, silicon monoxide and the like are typically used for the interference layer. A second U.S. Patent to Gelber, U.S. Pat. No. 3,990,784, is directed to coated architectural glass having a multi-layer coating on its surface. The coating is said to comprise first and second metal layers spaced from each other by a dielectric layer disposed between them. An additional metal oxide layer is said to be used optionally for anti-reflective purposes. Nickel is mentioned as being a suitable metal together with silicon dioxide as the dielectric layer.

The optical properties of silicon/silicon dioxide multilayer systems are discussed in Stone et al., Reflectance, Transmittance and Lost Spectra of Multilayer $Si/SO_2$ Thin Film Mirrors and Antireflection Coatings For 1.5 micrometers, Applied Optics, Vol. 29, No. 4 (1 Feb. 1990). Stone et al suggest that in the spectral region between 1.0 and 1.6 micrometers, a useful and easy to handle combination of paired layers is silicon and silica. Stone et al. is directed to the fabrication of multilayer systems. It is noted therein that the greater the difference in the index of refraction of the paired layers, the fewer the number of layers will be needed to obtain a desired level of reflectance. Silicon is noted to have a relatively high index of refraction. The paper states that silicon cannot be used as a material in the film pair for light below about 1.0 micrometers wavelength, for visible light, for example, due to its high absorption of light in that range. Visible light has a wavelength in the range of about 0.4 to 0.75 micrometers. Thus, while suggesting that a simple two layer anti-reflection coating can be made using silicon and silicon dioxide, the article clearly teaches that such anti-reflection coating is not suitable for application requiring transparency to visible light. The article notes that $Si/SiO_2$ film pairs for high reflectance mirrors and anti-reflection coatings have been deposited by reactive sputtering. The coatings discussed in the paper are said to have been deposited by electron beam evaporation onto glass substrates. The anti-reflection coatings described in the Stone et al article are said to consist of a layer of silicon about 150 Angstroms thick with a layer of $SiO_2$ thereover having a thickness selected to yield minimum reflection. A silicon layer of that thickness is substantially opaque to visible light and reflectance percentage is shown in the paper only for light far above the visible wavelength range. For a layer of silicon of that thickness, a $SiO_2$ layer of about 2800 Angstroms is employed by Stone et al. It is further stated that the minimum reflectance value is not very sensitive to the thickness to the silicon layer over a thickness range between 75 and 200 Angstroms. Even at the low end of this thickness range, however, the layer of silicon would be substantially opaque to the visible light component of ordinary sunlight.

Similar teachings are presented in Pawlewicz et al., 1315 nm Dielectric Mirror Fabrication By Reactive Sputtering presented at the Topical Meeting on High Power Laser Optical Components held at Boulder, Colo. on Oct. 18–19, 1984. Low levels of light absorption are reported in that paper for five reactively sputtered amorphous optical coating materials, including a $Si:H/SiO_2$ film pair. The low absorption was measured for light in the 1.3 micrometers range and it is taught in the conclusion of the paper that the Si:H material is not useable at visible wavelengths. The same point is made in Pawlewicz et al., Optical Thin Films-Recent Developments In Reactively Sputtered Optical Thin Films, Proceedings of the SPIE, Vol. 325, pp. 105–112 (Jan. 26–27, 1982). Table 1 of that paper lists light wavelengths of 1,000 to 9,000 nm (1.0 to 9.0 micrometers) as the range for which optical coatings of silicon are useful. Thin film coatings of $Si_{1-x} H_x$ for reducing light absorption of infrared laser wavelengths 1.06, 1.315 and 2.7 micrometers are discussed in Pawlewicz et al., Improved Si-Based Coating Materials for High Power Infrared Lasers (November, 1981).

The optical properties of Si:H are discussed also in Martin et al, Optical Coatings for Energy Efficiency and Solar Applications, Proceeding of the SPIE, Vol. 324, pp. 184–190 (Jan. 28–29, 1982). The effect is discussed of hydrogen content and Si:H bonding on various optical properties at 2 micrometers, a non-visible wavelength. Multilayer Si:H/$SiO_2$ laser mirrors with reflectance greater than 99% at non-visible wavelengths 1.315, 2.7 and 3.8 micrometers also are described. The article notes that Si:H/$SiO_2$ multilayer coatings are easily fabricated by sputtering, since only a single Si target is required, with either $H_2$ or $O_2$ being introduced into the sputtering chamber to form Si:H and $SiO_2$ layers, respectively. The high absorption coefficient in the visible region is said to make thin films of Si:H suitable for use in solar cells to absorb solar radiation.

Preferred Method of Manufacturing Polarizing Lens

An ophthalmic element comprises an injection molded, polymeric ophthalmic lens having a concave surface and a convex surface, and a laminate bonded to the injection molded, polymeric ophthalmic lens, the laminate comprising, in the following order: a) a first resinous layer, b) a functional layer selected from the group consisting of a light polarizing layer and a photochromic layer, and c) a second resinous layer, the first resinous layer being bonded to the convex surface of the injection molded, polymeric ophthalmic lens. The polymeric ophthalmic lens preferably comprises a polycarbonate resin. The first resin layer preferably is directly bonded to the polymeric ophthalmic lens. As an alternative structure, the first resinous layer may be adhesively bonded to the polymeric ophthalmic lens or may be fused to the polymeric ophthalmic lens. The functional layer preferably comprises a light polarizing layer or a photochromic layer. The ophthalmic element array be an injection molded, polymeric ophthalmic lens with no ophthalmic prescription power. A lens of the present invention is generally in the form of an optical element such as an optical lens, includes a primary part, such as a power portion and a secondary part, such as a functional portion. The functional portion and the power portion are attached together. The functional portion and the power portion are preferably integrally connected to each other and, more preferably, are fused together. No method previously existed for making polarized, prescription-specification, polycarbonate lenses. For example, the functional portion of the present invention provides a convenient and systematic way of combining a polarizing element with a polycarbonate lens, while retaining the ability to machine the polycarbonate lens to prescription specifications. The functional portion may include a functional member, such as a functional coating (not shown) or a functional film that is attached to a first sheet. Optionally, the functional portion may include a second sheet such that the functional member is sandwiched between the first sheet and the second sheet. Those skilled in the art will recognize that the functional member may be structured in a variety of ways, such as in composite or multi-layer fashion, in addition to the functional film. For example, the functional member could be structured to include film portions (not shown) that entrap and protect an operative substance, such as inorganic photochromic crystals. As another example, the functional member could include multiple functional film portions (not shown) that are laminated together using a conventional technique.

A functional element, such as a polarizing element (not shown), may be incorporated into the functional member, such as the functional film. The functional portion that includes the polarizing element may then be included in a mold, such as an injection mold, so that the film with the polarizing element is integrally molded as part of the lens. Alternatively, a different functional element, such as a photochromic, abrasion resistant, or tinting element, may be incorporated into the functional member, such as the film, and integrally molded as part of the lens. The functional elements may be made by many convenient manufacturing processes, including but not limited to lamination of the layers, adhesive securement of the individual layers, and extrusion of one or more layers (or all three layers) to form the three layer element (referred to as a laminate, but available for manufacture, as noted above, by processes in addition to lamination). A preferred method of making the functional element is to extrude layers in sequence or at the same time in the appropriate order of layers. The center layer of the three layers should be the layer with the functional capability so that a layer furthest from the ophthalmic element acts as a scratch resistant or protective layer, and the layer closest to the ophthalmic element acts as a cushion or tying layer to the ophthalmic element. It is structurally possible to use a two layer laminate (with the topmost protective resin layer and the ophthalmic element) by using a dry film adhesive or liquid adhesive between the ophthalmic element and the functional layer, but this is a much less preferred method of manufacture.

The preferred method of manufacturing the lens element is described in U.S. Pat. Nos. 6,338,426; 5,856,860; 5,827,614; and 5,757,459, which are herein incorporated by reference. In addition to which, as disclosed therein, it is to be noted that the functional portion may incorporate one or more functional properties. Essentially, the functional portion operates to put incorporated functional properties in working relation with the power portion. Examples of some functional properties of interest include filtering features, such as light polarization and photochromism. Additional examples of functional properties of interest include cosmetic properties, such as lens decor, indicia, tint and color. Still further examples of functional properties include durability features, such as hardness, abrasion resistance, and chemical resistance. Preferably, the functional portion includes a light polarizing component or a photochromic component that functions as a filtering portion of the lens. Alternatively, or in addition, portions of the functional portion may be tinted to function as a cosmetic portion of the lens.

The power portion of the lens may be contoured during initial formation to have an optical magnification characteristic that modifies the focal power of the lens. Alternatively, the power portion may be machined after initial formation to modify the focal power of the lens. The power portion provides a substantial amount of the optical power and magnification characteristics to the lens. The functional portion inherently affects the optical power and magnification characteristics of the lens since the functional portion contributes to the overall thickness of the lens. Preferably, however, the power portion provides the majority of the lens optical power and magnification characteristics. Apportioning the majority of optical power and magnification to the power portion permits selection of power portion material and power portion formation techniques that are optimum for superior lens optical power and magnification characteristics, without adversely affecting selection of optimum functional portion materials and formation techniques.

The power portion of the lens has both a rear surface and a front surface. The functional portion of the lens may be coextensive with the front surface of the power portion. Alternatively, the functional portion may overlap only a portion of the front surface of the power portion. There are no definite lines between the layers that can be seen unaided by the eye as the portions are integrally connected. Rather, because of intermolecular bonding, the demarcation line between the power portion and the functional portion may be at least somewhat blurred when the power portion and the functional portion are integrally connected.

The functional portion may take the form of a plate that is separated from a functional laminate. The functional laminate includes the functional member, such as the functional film. The functional film may include a base film and a functional medium that is incorporated into or onto the base film. When the functional member is other than the functional film, the functional member may include more than one base film. Alternatively, the functional film may include the functional medium and a base resin, with the functional medium and the base resin being homogeneously blended together prior to formation of functional film from the medium/resin mixture. Besides the functional member, the functional laminate includes the first sheet and, optionally, includes the second sheet. If the second sheet is included, the first and second sheets are located on opposing sides of the functional member.

The first sheet may be attached to the functional member, such as the functional film, by first adhesive, and the second sheet, if included, may be attached to the functional member by second adhesive. The first adhesive is typically not included when the functional member is the functional coating. A first coating may optionally be applied onto the first sheet and a second coating may optionally be applied onto the second sheet, if the second sheet is included.

Alternatively, the functional portion may consist of a functional wafer that includes the first sheet. In the functional wafer, the functional member, and thus the functional film, may consist of either the second sheet, the second coating, or the second sheet that is coated with the second coating. If the functional wafer includes the second sheet, the functional wafer may optionally also include either the first adhesive or the second adhesive to attach the second sheet to the first sheet. Also, the first sheet may optionally include the first coating.

The functional member, as indicated, preferably includes either the light polarizing property or the photochromic property or a combination of the two. When the functional member 20 includes the light polarizing property, the base film or resin is preferably of the polyvinyl alcohol-type, as described in U.S. Pat. No. 5,051,309 to Kawaki, which is hereby incorporated by reference. Specific examples of suitable resins of either the base film or the base resin include polyvinyl alcohol, polyvinyl formal, polyvinyl acetal, and saponified (ethylene/vinyl acetate) copolymer film, with polyvinyl alcohol being especially preferred. When the functional member includes the photochromic property, the base film or base resin may include homo and copolymers of various materials, such as polyurethanes, cellulose acetate butyrate, poly(n-butyl methacrylate), poly(isobutyl methacrylate), poly(methyl methacrylate), poly(ethyl methacrylate), polyethylene, polypropylene, poly(acrylonitrile), poly(vinyl acetate), poly(vinyl chloride), poly(butadiene), and polyamide, that are formed from appropriate monomers and pre-polymers using conventional polymerization technology. Polyurethanes are the preferred materials for the base film or base resin since polyurethanes readily incorporate photochromic dyes and since photochromic dyes activate and perform well in cellulose acetate butyrate. Examples of suitable dichroic substances, such as dichroic dyes, for imparting the light polarizing property to the base film or resin are listed in U.S. Pat. No. 5,051,309 to Kawaki et al. Some examples of suitable dichroic substances include Chlorantine Fast Red (C.I. 28160), Chrysophenine (C.I. 24895), Sirius Yellow (C.I. 29000), Benzopurpurine (C.I. 23500), Direct Fast Red (C.I. 23630), Brilliant Blue 6B (C.I. 24410), Chlorazol Black BH (C.I. 22590), Direct Blue 2B (C.I. 22610), Direct Sky Blue (C.I. 24400), Diamine Green (C.I. 30295), Congo Red (C.I. 22120), and Acid Black (C.I. 20470). It is to be understood that the dichroic substance incorporated in the base film or resin may be either a single dichroic substance or a mixture that includes two or more of the dichroic substances. In addition, non-dichroic dyes, such as melanin or other passive dyes, may be incorporated in the base film or resin to provide special wavelength filtering functions. The functional member may incorporate any organic or inorganic photochromic substance or compound, such as photochromic substances or compounds that are compatible with the base film or resin and that are capable of imparting photochromic properties to the base film or resin. Also, the photochromic substances or compounds incorporated in the functional member may be a mixture that includes two or more different dichroic substances or compounds. Examples of organic photochromic compounds suitable for imparting photochromic properties to the functional member 20, such as the base film or resin, include naphthopyrans, spironaphthopyrans, fulgides, fulgimides, salicylates, triazoles, oxazoles, and azobenzenes. Silver halide is one example of an inorganic photochromic compound that is suitable for imparting photochromic properties to the functional member, such as the base film or resin.

The functional portion substantially prevents the structure of the dichroic substance(s) or the photochromic compound(s) from being altered due to placement of the dichroic substance(s) or the photochromic compound(s) in working relation with the power portion. Preferably, the functional portion prevents alteration of the structure of dichroic substance(s) and photochromic compound(s) due to placement of the dichroic substance(s) or the photochromic compound(s) in working relation with the power portion. Additionally, the functional portion substantially prevents the light polarizing activity of the dichroic substance(s) and the photochromic activity of the photochromic compound(s) from being altered due to placement of the dichroic substance(s) or the photochromic compound(s) in working relation with the power portion. Preferably, the functional portion prevents alteration of the light polarizing activity of the dichroic substance(s) and prevents any significant alteration of the photochromic activity of the photochromic compound(s) due to placement of the dichroic substance(s) or the photochromic compound(s) in working relation with the power portion.

The lens may be either a single vision lens, a progressive multi-focal lens, an aspheric lens, an aspheric multi-focal lens, or a stepped multi-focal lens. Single vision lenses, which may take the form of the lens, have essentially the same focal power at any point on the outside surface of the lens when objects (not shown) located in front of the functional portion of the lens are viewed through the lens from a select point located behind the lens and on an axis. The outside surface should be substantially smooth, and is preferably very smooth, to help minimize generation of any irregular, unpredictable optical effects in the lens.

For the progressive multifocal lens, which may also take the form of the lens, the focal power of the lens changes in continuous increments when objects located in front of the outside surface are viewed. For the progressive multi-focal lens, the focal power of the lens changes in continuous increments when moving about the outside surface, in part due to the smooth continuous nature of the outside surface of the lens that is progressive multi-focal. When the lens is progressive multi-focal, the front surface and the outside surface are aspherically shaped.

The various designs, modifications and methods of preparation of these lenses is described in U.S. Pat. Nos. 6,338,426; 5,856,860; 5,827,614; and 5,757,459, which, as noted earlier, are incorporated herein by reference to that disclosure.

In addition to the layers already mentioned as possibly present on the lens of the invention, it is often desirable to provide hydrophobizing or oleophilizing layers to the surface of the lens to provide various desirable physical effects (as opposed to optic effects). For example, the antireflection coatings mentioned above may be applied by evaporative processes such as those described in copending U.S. patent application Ser. No. 09/562,686, which is incorporated herein by reference, and U.S. Pat. No. 4,678,688.

Additionally, thin coatings (thin refers to the fact that the coating is not of sufficient thickness and optical properties to adversely destroy or diminish the interference effect of the bigradient layer(s), which effect is thickness dependent) may be applied to the surfaces for antifogging effects, and altering the surface contact properties (wetting properties) of the layers. For example, thin layers (not limited to monolayers or dilayers) of vapor deposited oleophiling compounds or polymers or hydrophilizing compounds or polymers, such as compounds with fluorocarbon segments or siloxane segments, or materials with other segments that provide the desired surface properties. The compounds a) may merely coat the surface, and be retained loosely by physical attraction, b) may have a reactive group that will react to the surface of the metal, metal oxide, non-metal oxide or polymeric underlayer, c) may polymerize on the surface (with or without chemical reactivity to the underlying layer). These layers also tend to deposit in any defects on the underlying surface, which may occur during deposition, and therefore improve the smoothness of the surface.

The hardcoat layers, as well understood in the art, may be acrylic materials (e.g., hydantoin hexaacrylate, crosslinked acrylates, acrylate-siloxanes, copolymers thereof and the like) silanes and siloxanes (e.g., tetraalkoxy silanes, trialkoxy silanes, ambifunctional silanes, such as epoxysilanes, acyloylsilanes, methacryloyl silanes, and copolymers thereof) and the like. These materials are well known in the art, and their diverse methods of application and composition are known in the art. Materials such as those described in U.S. Pat. Nos. 6,057,040; 4,876,305; 4,378,389; 4,378,250; 4,306,954; 4,262,072; 4,349,011; 3,961,977; 3,837,876; and 3,166,527 are non-limiting examples of such materials.

The present invention is more particularly described in the following examples which are intended as illustrations only since numerous modifications and variations within the scope of the general formulation will be apparent to those skilled in the art.

EXAMPLES

Examples 1–4

Examples 1–4 demonstrates formation of the lens with the polarizing property incorporated in the functional portion. Additionally, the lens formed in Examples 1–4 each have different physical dimensions and different focal powers. More particularly, in Examples 1–4, the functional laminate included the functional film, the first and second sheets, and the first and second adhesives. The functional laminate also included the second coating, but did not include the first coating. The functional laminate included the light polarizing property and consisted of POLA SHEET™ obtained from Mitsubishi Engineering Plastics Co. The base film of the functional film was made of polyvinyl alcohol, and the first and second sheets were made of polycarbonate. The film was about 0.003 mm thick and the first and second sheets were each about 0.3 mm thick. The adhesives, which were each about 0.003 mm thick, were ordinary acrylic-type, epoxy-type, or urethane-type adhesives. The coating, which was about 0.003 mm thick, was a hard polysiloxane coating. For each lens of examples 1–4, the plate was cut from the functional laminate to make the functional portion. The plate was generally round in shape and had substantially the same dimensions as the surface of the power portion to be made. The plate, which was not pre-shaped, was placed within the recesses so that the second sheet faced the convex surface. The plate was observed to have a snug fit within the recesses that was suitable for creating the mechanical seal. The vacuum source was activated to 28.5 millimeters of mercury to effect the pneumatic seal and to pull the plate 17 into registry with the convex surface. For examples 1–4, the mold halves were then closed to make the mold cavity using the molding machine. The clamping force of the machine used in these examples was 160 tons, and the resin injection velocity was 1.5 inches per second. The resin melt temperature of the machine was 585 F, and the mold temperature was 265° F. Molten Lexan™7 polycarbonate resin was injected into the cavity. Lexan™7 polycarbonate is available from General Electric Plastics Co. of Pittsfield, Mass. After cooling, the mold halves 122, 124 were opened and the lens was ejected from the mold half For the lenses of Examples 1–4, it was noted that no injected polycarbonate flowed between the plate and the convex surface. Additionally, no delamination of the functional portion and no warping of the functional film was observed. Furthermore, the functional portion and the power portion were found to be firmly attached to each other. No voids or inclusions were found anywhere in the power portion, including proximate the functional portion. After the inspection, the second sheet of each lens of Examples 1–4 was coated with the coating using a conventional dip-coating technique.

The resultant true curve of each lens is the optical curve of the lens that is measured between opposite sides of the lens along the outside surface, as in FIG. 1. The design curve is the tooled curve of the lens, namely the measured curve of the convex surface of the mold cavity. Incorporation of the functional portion into the lens causes essentially no variation between the resultant true curve and the design curve for each of the lenses produced in Examples 1–4. The lenses made in Examples 1–4 were ground to different finished prescription focal powers and were then found to have good combined power in the spherical and cylindrical axes. Also, the optical properties of the lenses, including the optical clarity, optical wave, and optical power, were examined using a conventional lensometer apparatus and were found to be excellent. The functional portions of each of the lenses were also determined to be well adhered to the respective power portions. Also, the functional portions of each of the lenses were tested for delamination and it was observed that the sheets did not delaminate from the functional film. Additionally, the outside surface of each lens was tested for abrasion using the test detailed in ASTM D 3359-78 and found to exhibit superior abrasion resistance.

Examples

| EXAMPLE | Required Rx(D) | Finished Rx(D) | Center/Edge Thickness (mm) | Polarized Efficiency | Logo | Luminous Transmission Top | Luminous Transmission Middle | Luminous Transmission Bottom |
|---|---|---|---|---|---|---|---|---|
| 1. 6 Base | −1.00 – 1.00 × 90 | −0.87 – 1.00 × 92 | 1.5 | 97 | 4 mm × 4 mm | 9.2 | 16.0 | 9.2 |

-continued

| EXAMPLE | Required Rx(D) | Finished Rx(D) | Center/Edge Thickness (mm) | Polarized Efficiency | Logo | Luminous Transmission Top | Luminous Transmission Middle | Luminous Transmission Bottom |
|---|---|---|---|---|---|---|---|---|
| 2. 4 Base | −3.00 | −2.87 | 1.0 | 96 | 2 mm × 2 mm | 9.1 | 15.8 | 9.1 |
| 3. 8 Base | +2.00 + 1.00 × 62 | +2.00 + 0.87 × 61 | 4.2 | 97 | 4 mm × 4 mm | 9.5 | 16.2 | 9.5 |
| 4. 0.5 Base | −6.0 − 2.0 × 97 | −6.25 − 2.0 × 95 | 1.2 | 98 | 4 mm × 4 mm | 9.1 | 15.8 | 9.1 |

All lenses were Single Vision, Gray, Silver Mirror Lenses.

What is claimed is:

1. An ophthalmic element comprising:
   a polymeric ophthalmic lens having a concave surface and a convex surface, and a laminate bonded to the polymeric ophthalmic lens, the ophthalmic element comprising, in the following order from a forward face of the element:
   a) an a bigradient interference layer having segments separated by a gap in the interference material between the segments of the bigradient interference layer,
   b) an organic polymeric hard coat layer extending across the gap in the interference material,
   c) a polymeric lens segment, and
   d) a polarizing layer.

2. The ophthalmic element of claim 1 wherein said polymeric lens segment comprises a polycarbonate resin.

3. The ophthalmic element of claim 1 wherein the polymeric ophthalmic lens comprises an injection molded, polymeric ophthalmic lens having a concave surface and a convex surface.

4. The ophthalmic element of claim 1 wherein the lens comprises two lens segments that have been bonded together.

5. The ophthalmic element of claim 2 wherein the lens comprises two lens segments that have been bonded together.

6. The ophthalmic element of claim 3 wherein the lens comprises two lens segments that have been bonded together.

7. The ophthalmic element of claim 4 wherein the polarizing layer is between the two lens segments.

8. The ophthalmic element of claim 5 wherein the polarizing layer is between the two lens segments.

9. The ophthalmic element of claim 6 wherein the polarizing layer is between the two lens segments.

10. The ophthalmic element of claim 4 wherein the polarizing layer comprises a polarizing laminate that is positioned between the two lens segments.

11. The ophthalmic element of claim 5 wherein the polarizing layer comprises a polarizing laminate that is positioned between the two lens segments.

12. The ophthalmic element of claim 6 wherein the polarizing layer comprises a polarizing laminate that is positioned between the two lens segments.

13. The ophthalmic elements of claim 1 wherein the hardcoat comprises a layer comprising units selected from the group consisting of acrylates, siloxanes, and epoxy resin units.

14. The ophthalmic element of claim 4 wherein the hardcoat comprises a layer comprising units selected from the group consisting of acrylates, siloxanes, and epoxy resin units.

15. The ophthalmic element of claim 8 wherein the hardcoat comprises a layer comprising units selected from the group consisting of acrylates, siloxanes, and epoxy resin units.

16. The ophthalmic element of claim 10 wherein the hardcoat comprises a layer comprising units selected from the group consisting of acrylates, siloxanes, and epoxy resin units.

17. The ophthalmic element of claim 1 wherein the interference layer has an image therein caused by variation in the thickness of the interference layer.

18. The ophthalmic element of claim 17 wherein the variation in thickness includes a complete absence of interference layer material in the form of an image.

19. The ophthalmic element of claim 18 wherein the image is in the form of a logo.

20. An ophthalmic element comprising:
    a polymeric ophthalmic lens having a concave surface and a convex surface, and a laminate bonded to the polymeric ophthalmic lens, the ophthalmic element comprising, in the following order from a forward face of the element:
    a) an a bigradient interference layer having segments separated by a gap in the interference material between the segments of the bigradient interference layer,
    b) an organic polymeric hard coat layer extending across the gap in the interference material, the organic polymeric hard coat layer comprising units selected from the group consisting of acrylates, siloxanes, and epoxy resin units,
    e) a polymeric lens segment, and
    f) a polarizing layer.

21. The ophthalmic element of claim 20 wherein the image is in the form of a logo.

* * * * *